Oct. 13, 1942.  R. S. BIGELOW  2,299,005
CONNECTING MEANS FOR SHAKER CONVEYER TROUGH LINES
Filed March 22, 1940
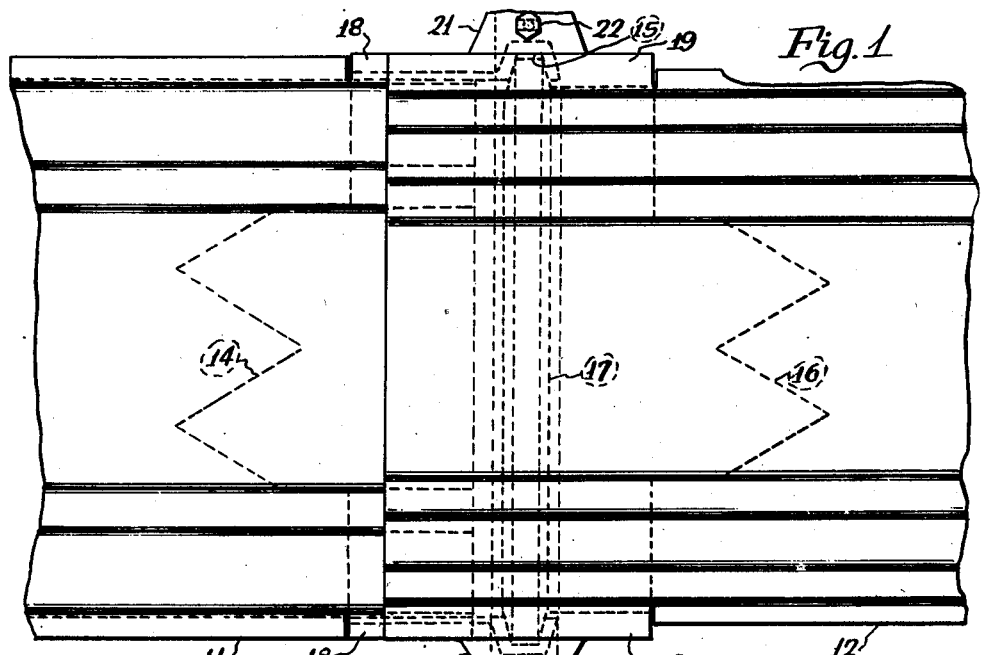
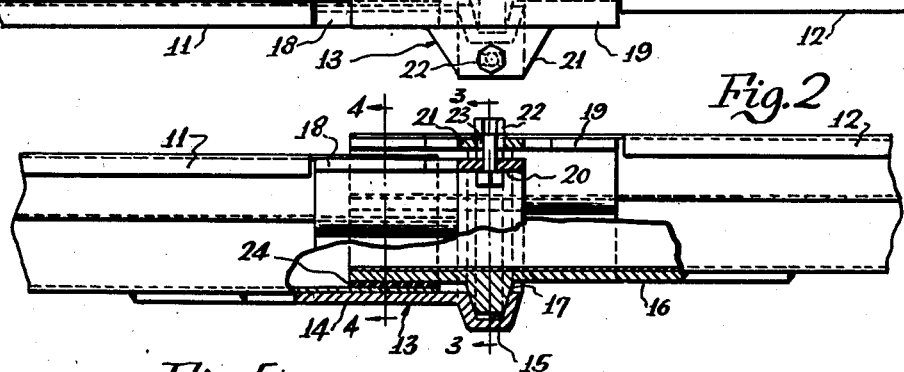
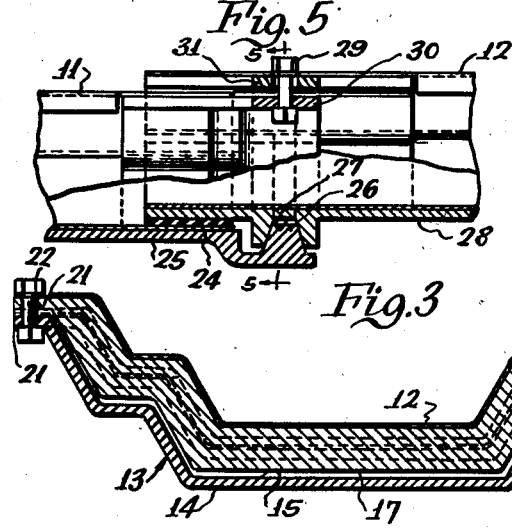
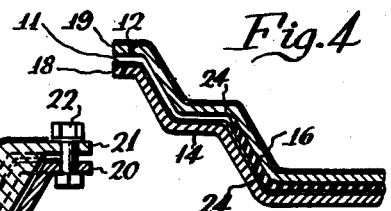
INVENTOR
Roy S. Bigelow
BY
Clarence F. Poole
ATTORNEY Patented Oct. 13, 1942

2,299,005

UNITED STATES PATENT OFFICE 2,299,005

CONNECTING MEANS FOR SHAKER CONVEYER TROUGH LINES

Roy S. Bigelow, Chicago, Ill., assignor to Goodman Manufacturing Company, Chicago, Ill., a corporation of Illinois Application March, 22, 1940, Serial No. 325,330

4 Claims. (Cl. 198—220)

This invention relates to improvements in connecting means for shaker conveyer trough lines.

Heretofore, shaker conveyer trough lines have been fastened together by bolts extending through eyes projecting laterally from opposite sides of the troughs, or by various forms of wedge connections. Both the connecting bolt and wedge type of fasteners tend to connect the troughs rigidly together and have not been altogether satisfactory due to the fact that it takes an undue amount of time to connect the troughs together and to disconnect them when it is desired to extend the conveyer, and due to the fact that the abutting ends of the connecting parts pene over and allow the trough sections to move with respect to each other about transverse axes at the points of the abutting connections. This causes bending and breakage of the connecting members, besides causing breakage of the troughs in the trough line.

My invention has as its principal objects to overcome these difficulties by providing a novel form of fastening device for the troughs of a shaker conveyer trough line, so arranged that the bearing areas of the connecting parts are relatively large and also so arranged that the troughs may be attached or disconnected in a more facile and efficient manner than formerly.

A more specific object of my invention is to provide a simplified form of connection between the troughs of a shaker conveyer trough line of a novel construction, which consists in a wedge-shaped recess associated with one trough of the trough line and a wedge-shaped connecting tongue or projection associated with the adjacent end of another trough of the trough line and adapted to engage this recess.

Other objects of my invention will appear from time to time as the following specification proceeds and with reference to the accompanying drawing wherein:

Figure 1 is a top plan view of adjacent ends of two troughs of a shaker conveyer trough line, illustrating one form of trough connecting means of my invention;

Figure 2 is a view in side elevation of adjacent ends of the troughs shown in Figure 1, with certain parts broken away and certain other parts shown in substantially longitudinal section, in order to more clearly illustrate certain details of the connecting device for the trough sections;

Figure 3 is a transverse sectional view taken substantially along line 3—3 of Figure 2;

Figure 4 is a fragmentary transverse sectional view taken substantially along line 4—4 of Figure 2; and Figure 5 is a fragmentary view in side elevation of adjacent ends of two troughs of a shaker conveyer trough line, with certain parts broken away and certain other parts shown in substantially longitudinal section, and illustrating a modified form of my invention.

Referring now in particular to the drawing and the novel features of my invention, adjacent ends of two troughs or pans 11 and 12 of a shaker conveyer trough line are herein shown as being connected together in overlapping relationship with respect thereto by a connecting device generally indicated by reference character 13.

The connecting device 13 includes a forwardly projecting reinforcing and connecting plate 14 secured to the trough section 11. Said plate is formed to conform substantially to the form of said trough section in transverse section, and extends upwardly along opposite sides of said trough section and beyond the forward end thereof. A recess or socket 15 is provided at the forward end of said plate and extends transversely across and upwardly along the sides of the trough section 12. Said socket is herein shown as being formed integral with said plate and as opening to the top of said plate. The inner walls of said socket are inclined outwardly, to form a wedge-shaped socket with the open top portion thereof of a greater width than the bottom thereof.

A reinforcing and connecting plate 16, of a form somewhat similar to the plate 14, is secured to the adjacent end of the trough section 12 and conforms to the form of said trough section. Said plate extends upwardly along opposite sides of said trough section and is provided with a wedge-shaped projecting tongue or connecting member 17, adapted to engage the socket 15. Said tongue is herein shown as being formed integral with said plate and extending transversely across said plate and upwardly along opposite sides thereof.

The plates 14 and 16 are each provided with laterally projecting upper flanges 18 and 19 respectively. The flanges 18, 18 have connecting ears 20, 20 projecting laterally from opposite sides thereof. The flanges 19, 19 have similar laterally projecting connecting ears 21, 21. The ears 20, 20 and 21, 21 are connected together, and the projecting tongue 17 is held in engagement with the recess 15 by means of connecting bolts 22, 22. As herein shown, said connecting bolts extend through apertures in the lower connecting ears 20, 20, which are of substantially the same diameters as the diameters of said bolts, and extend through elongated slots 23, 23 in the upper ears 21, 21. This prevents the placing of shearing stresses on said bolts and permits a limited amount of movement of said trough sections with respect to each other in vertical planes.

A member 24 may be secured to the bottom of the plate 16. Said member, as herein shown, extends upwardly along the sides thereof for a short distance. Said member is preferably made from a resilient material such as rubber, and engages the inside of the trough section 11 to space said trough sections vertically and to prevent dirt, such as fine coal, from working into the socket 15 during connection or disconnection of the trough sections.

In the form of my invention shown in Figure 5, a reinforcing and connecting plate 25 is mounted on the bottom of and extends upwardly along opposite sides of the trough section 11 and is provided with an upwardly projecting wedge-shaped engaging tongue 26 which is adapted to engage a wedge-shaped socket 27 opening towards the bottom and outer sides of a connecting and reinforcing plate 28. Said plate extends along the bottom of and upwardly along opposite sides of the trough section 12 in a manner similar to the plate 16. Bolts 29, 29 extending through ears 30, 30 and 31, 31, which project laterally from the upper flanges of the plates 25 and 28, are provided to hold said sockets and tongues in engagement with each other.

It may be seen from the foregoing that a simplified form of connecting means has been provided for connecting adjacent ends of the troughs of the shaker conveyer trough line together, which is so arranged that the troughs may be connected by simply dropping a wedge-shaped connecting member projecting from one trough into a socket associated with the other trough, and holding these sockets and connecting members in engagement with each other by means of connecting means, and that this connection is such as to positively connect said trough sections together.

It may further be seen that the bearing surface of the connecting parts is relatively large so as to eliminate all liability of the connecting parts peening over and that the means for holding the connecting members in connecting engagement with each other are free from shearing stresses during reciprocation of the conveyer.

While I have herein shown and described forms in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A connecting means for a pair of conveyer troughs including a recessed member associated with one trough, a projecting tongue associated with another of said troughs and adapted to have engagement with the recess of said recessed member, and means for preventing disengagement of said tongue and recess during reciprocation of the conveyer including connecting means extending through overlapping laterally projecting parts of said troughs, the connection between said parts and said connecting means being such as to permit said connecting means to maintain said troughs in connected engagement with each other, but to relieve said connecting means from shearing stresses during reciprocation of the conveyer.

2. A connecting means for a pair of conveyer troughs including a recessed member associated with one trough, the recess of said recessed member being of a wedge-shaped cross section, a projecting tongue of a wedge-shaped cross section associated with another of said conveyer troughs and adapted to have engagement with the recess of said recessed member, and means for preventing disengagement of said tongue and recess during reciprocation of the conveyer including a pair of connecting bolts extending through overlapping laterally projecting parts of said troughs and slotted connections between said bolts and one of said parts of one of said troughs to permit said bolts to maintain said troughs in connected engagement with each other but to relieve said bolts from shearing stresses during reciprocation of the conveyer.

3. A connecting means for adjacent ends of a pair of conveyer troughs including a connecting member extending along the bottom and sides of one of said troughs and projecting beyond the end thereof, a connecting member extending along the bottom and sides of said other trough and adapted to overlap said other member, a wedge-shaped tongue projecting upwardly from one of said members, and said other member having a recessed portion opening towards the ground and closed at its upper end and adapted to be engaged by said tongue, overlapping laterally projecting flanged portions projecting from said connecting members, and connecting bolts extending through said flanged portions, for holding said projecting members in engagement with said sockets.

4. A connecting means for connecting adjacent ends of a pair of conveyer troughs together including a connecting member extending across the bottom and upwardly along sides of one of said troughs and projecting beyond the end thereof, a connecting member extending across the bottom and upwardly along the sides of said other trough and adapted to overlap said other member, one of said members having a wedge-shaped projecting tongue extending transversely thereacross and upwardly along opposite sides thereof and projecting upwardly and inwardly from said member, and the other of said members having a recessed portion opening towards the ground and closed at its upper end and extending transversely thereacross and upwardly along opposite sides thereof and adapted to be engaged by said tongue.

ROY S. BIGELOW.